United States Patent [19]

Kinney

[11] Patent Number: 4,765,493
[45] Date of Patent: Aug. 23, 1988

[54] GRAVITY FEED MERCHANDISE RACK

[75] Inventor: Thomas R. Kinney, Crete, Ill.

[73] Assignee: The Interlake Corporation, Oak Brook, Ill.

[21] Appl. No.: 89,223

[22] Filed: Aug. 25, 1987

[51] Int. Cl.⁴ .............................................. A47F 5/00
[52] U.S. Cl. .................................. 211/59.2; 211/151; 193/35 R
[58] Field of Search ...................... 211/151, 59.2, 191, 211/187; 193/35 R

[56] References Cited

U.S. PATENT DOCUMENTS

| | | | |
|---|---|---|---|
| 2,013,284 | 9/1935 | Michaud | 211/59.2 |
| 3,269,557 | 8/1966 | Wahl | 211/151 |
| 3,744,610 | 7/1973 | Tabler | 193/35 R |
| 3,900,112 | 8/1975 | Azzi et al. | 211/151 X |
| 4,068,751 | 1/1978 | Azzi | 193/36 |
| 4,168,780 | 9/1979 | Parrott | 193/35 R X |
| 4,239,100 | 12/1980 | Corey | 193/35 R |
| 4,372,451 | 2/1983 | Rasmussen et al. | 211/151 X |
| 4,383,614 | 5/1983 | Miller | 211/59.2 |
| 4,394,910 | 7/1983 | Miller | 211/59.2 |
| 4,453,641 | 6/1984 | Rasmussen et al. | 211/151 |
| 4,498,593 | 2/1985 | Silver | 211/59.2 |

Primary Examiner—Robert W. Gibson, Jr.
Attorney, Agent, or Firm—Allegretti & Witcoff, Ltd.

[57] ABSTRACT

Means for installing, adjusting and securing tracks of a gravity feed mechandise rack. Preferably, a strip bearing slots is spaced slightly above the horizontal support surface of each of the front and rear cross members of a shelf for the rack. Each track has a pair of cooperating side rails, preferably with in-turned lower edges. During assembly, each end of a track slides into slots while the in-turned edges slide between a strip and a support surface. The sizes of the tracks, strips and slots are such that the tracks may be placed into a locked position by simple longitudinal manipulation.

9 Claims, 2 Drawing Sheets

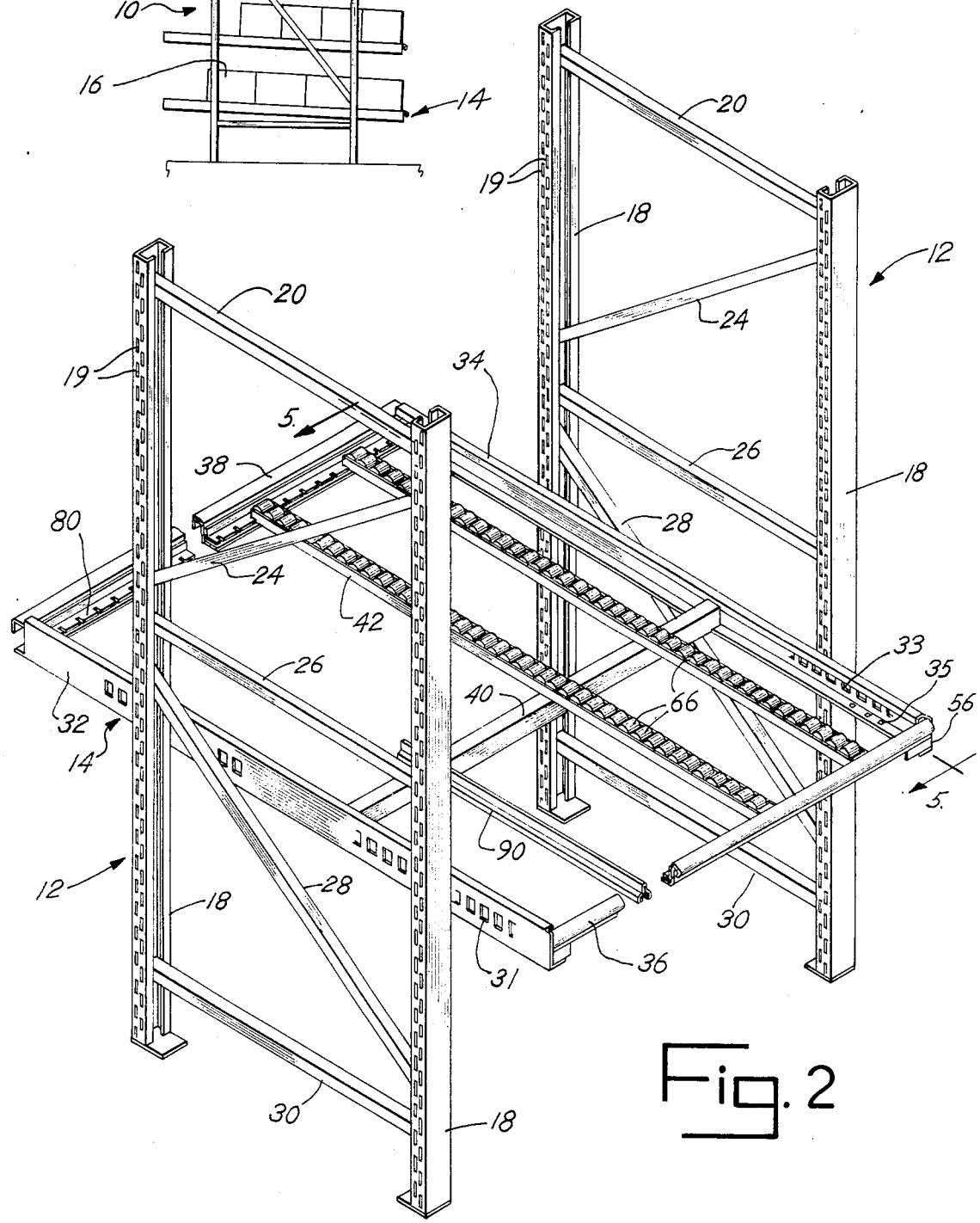

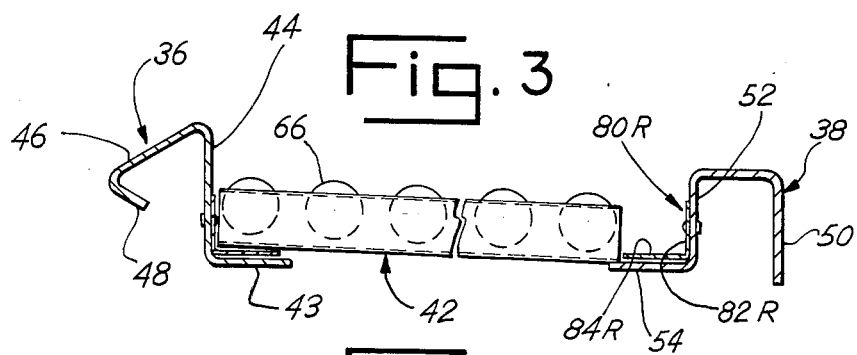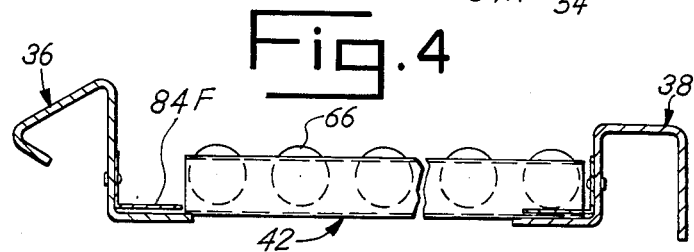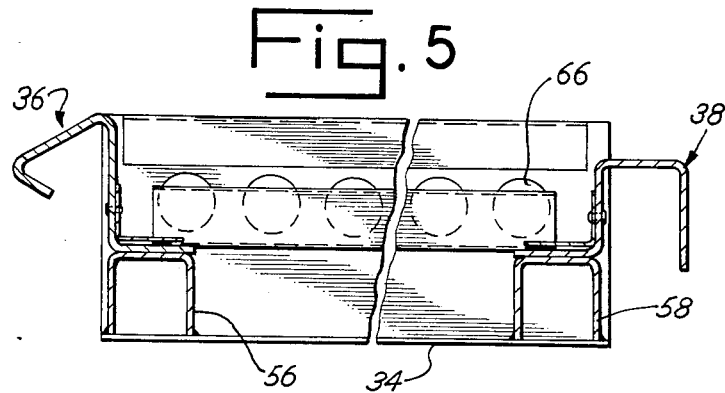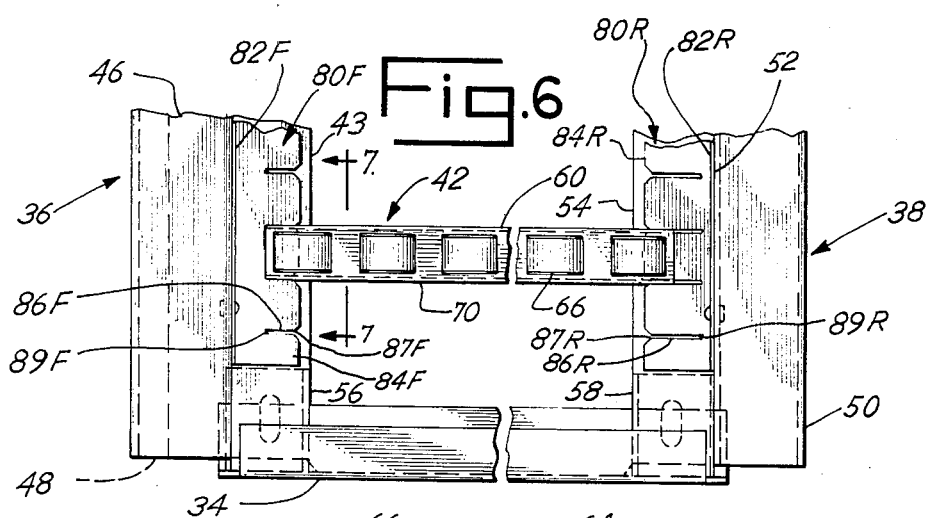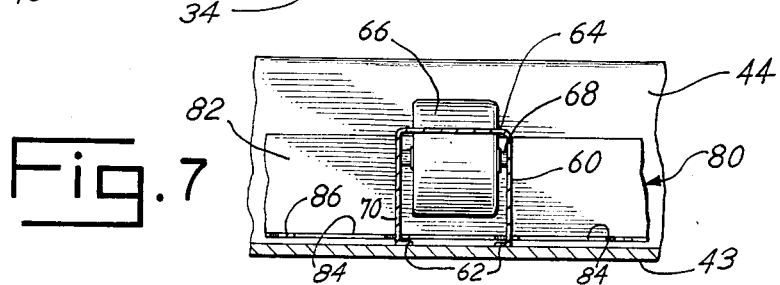

GRAVITY FEED MERCHANDISE RACK

This invention relates to a gravity feed storage and delivery system for automatically conveying merchandise from a storage position to a delivery position and more particularly, to a means for adjustably securing the support tracks to the storage shelf.

PRIOR ART

Gravity feed storage and delivery systems of this type are known in the art. U.S. Pat. No. 4,372,451 (Rasmussen and Donkle) shows such a system in which the wheel tracks are adjustably secured to cross members of the storage shelf by means of clips which embrace the tracks and have pins that fit into cooperating slots in the cross members. These clips are manually removable to adjust the position of the tracks on the cross members to facilitate supporting merchandise containers of different widths. The clips are awkward to manipulate and because they are separate members, they are frequently misplaced.

U.S. Pat. No. 3,900,112 (Azzi and Wyeth) discloses an inclined shelf in which the wheel tracks are adjustably secured to the front and rear cross members by means of spring flanges which bear against and extend above the top of the track members. The flanges prevent upward movement of the tracks with respect to the cross member. Lateral movement of the tracks is prevented by retainer fingers spaced along the cross members which fingers engage the inside walls of the hollow track. The exposed position of the flanges above the track members makes them susceptible to damage, and the resiliency of the flanges limits the force with which the tracks can be held in place.

U.S. Pat. No. 3,744,610 (Tabler) discloses a longitudinally-extending double flange spring member which embraces longitudinal projections on the interior of the hollow track member.

U.S. Pat. No. 4,383,614 (Miller) and U.S. Pat. No. 4,393,910 (Miller) show support surfaces for the ends of the track members which have flanges containing spaced notches for locking the tracks against lateral movement. Clips slideably secured to the underside of the tracks engage the bottom of the support surface to prevent upward displacement of the track.

U.S. Pat. No. 4,239,100 (Corey) discloses square cutout edges that help secure a roller track above a base plate.

Experience has shown that merchandise racks must be shipped in an unassembled state if shipment damage and freight charges are to be minimized. The rack design also must provide easy assembly at the site of use for shelf widths of nine feet or more and track lengths of twenty feet or more. The racks are most easily assembled by completing a shelf frame and then mounting the tracks on the completed frame. The art has long sought a construction that avoids clips, especially those which extend above the top of the roller track and that facilitates assembly without tools by providing a frame surface that supports a track while it is being guided into a secure position. Since twenty feet long sections of track are heavy, some means of supporting the track during assembly is highly desirable. None of the known prior art arrangements is capable of providing such construction features.

SUMMARY OF THE INVENTION

The present invention relates to a shelf for a gravity feed merchandise storage and delivery rack. The shelf preferably includes front and rear cross members that are supported by side rails. The merchandise moves along tracks that are supported by the cross members.

The present invention provides means for adjusting the tracks laterally along the front and rear cross members and for locking the tracks against lateral and vertical displacement without the use of clips or spring members. The inventive structure is greatly simplified in comparison with the prior art. The preferred structure requires only a single slotted strip slightly spaced above the horizontal support surface of each cross member. Each track has a pair of cooperating side rails, preferably with in-turned lower edges. During assembly, the ends of the track slide into the slots while the in-turned edges slide between the slotted strip and the support surface. The lengths of the tracks, the distance between the front and rear slotted strips, and the lengths of the slots are such that the tracks may be placed into locked position by simple longitudinal manipulation without use of any tools while the tracks are conveniently held on the support surfaces.

THE DRAWINGS

These and other advantages of the invention will become apparent from the following description when read in conjunction with the drawings in which:

FIG. 1 is a diagrammatic side elevation of a rack showing cartons of merchandise on inclined shelves.

FIG. 2 is a perspective view of one section of a modular rack showing a tilted shelf mounted between side support frames.

FIG. 3 is a fragmentary side elevational view partially in cross section of a shelf constructed in accordance with the preferred embodiment of the invention having wheel tracks shifted toward and above the front cross member of the shelf. The drawing shows only the ends of the track, the center portion having been broken away.

FIG. 4 is a view similar to FIG. 3 showing the wheel track shifted to the rear cross member.

FIG. 5 is a view similar to FIG. 3 taken along line 5—5 in FIG. 2 showing the wheel track centrally positioned between the front and rear cross members.

FIG. 6 is a fragmentary top plan view of a shelf constructed in accordance with the preferred embodiment of the invention and showing a track member centrally positioned between the front and rear cross members of the shelf.

FIG. 7 is a cross sectional elevational view of a wheel track mounted on a cross member in accordance with the preferred embodiment of the invention taken along line 7—7 in FIG. 6.

DETAILED DESCRIPTION

The general arrangement of the rack indicated generally at 10 is shown in FIG. 1. A pair of spaced side frame members 12 support a series of stacked shelves 14 extending between the side frames. Cartons of merchandise 16 are placed on the shelves and flow by gravity down the tracks from the higher rear end of the shelf to the lower front end. When a carton is removed from the front end of the shelf, the cartons behind flow down the tracks by gravity to replace the carton removed. The supply of cartons is replenished from the rear. In a warehouse, a large number of modular units are set up side by side.

Referring to FIG. 2, the side frames 12 comprise a pair of perforated hollow columns 18 welded together with cross beams 20, 24, 26, 28, 30. Shelf 14 has a pair of perforated side rails 32, 34 connected together by a front cross member 36 and a rear cross member 38 bolted to the side rails. Cross member 40 intermediate the front and rear cross members can be used to provide additional support for the tracks where the span between the front and rear is long. The intermediate cross member prevents sagging of the track. The ends of cross members 40 are shaped to fit into horizontal slots 35 that are formed in side rails 32, 34. Track members 42 are mounted at their ends on cross members 36, 38 in the manner described in detail below.

Side rails 32, 34 are secured to columns 18 in a conventional manner by well-known three prong clips (not shown) which extend through openings 31, 33 in the rails and lock into slots 19 in the upright columns. Slots 19 are arranged in two parallel rows and are staggered to permit vertical adjustment of the shelves. Also, the spaced slots in the rear columns permit adjusting the tilt of the shelves at any desired angle. Normally, the distance between adjacent slots is about one-half inch which provides the desired extent of adjustability. Numerals may be inscribed at intervals along the columns to facilitate measuring equal spacing at both sides of the shelves.

Referring to FIGS. 3–6, the front cross member 36 of shelf 14 is L-shaped in cross section and has a horizontal support flange 43 and a vertical flange 44 with an added downturned flange 46 at the front. Flange 46 has a turned under lip 48 which may serve as a handle to facilitate carrying the shelf. The rear cross member 38 has a cross section of an inverted U with legs 50, 52 and a horizontal support flange 54 along its front edge. As shown in FIGS. 2, 5, and 6, cross members 36, 38 are bolted to channels 56, 58 comprising part of the perforated side rails 32, 34. The rectangular structure formed by members 32, 34, 36, and 38 comprises the frame of the shelf 14.

A plurality of tracks stretch between the cross members 36, 38. The number of tracks will vary in accordance with the size of the merchandise cartons to be supported by the tracks. The invention is particularly concerned with the manner in which the tracks are secured at their ends to permit moving them laterally and locking them in place without use of any tools or additional separate elements, such as clips.

Referring to FIG. 7, the tracks are channels having in-turned lower engagement edges or horizontal flanges 62. Preferably, the tracks have spaced openings in the top channel wall 64 through which rollers 66 project to provide a rolling slide for containers 16. The rollers are mounted on shafts extending across the space between engagement side rails 60, 70 of the channels.

Referring to FIGS. 6 and 7, cross members 36, 38 each support on L-shaped rigid slot defining member 80 having a vertical wall 82 and a horizontal strip 84 riveted to upright members 44 and 52, respectively. The letters F or R in the drawings refer to portions of the front or rear strip, respectively. The horizontal strip 84 is spaced above the horizontal support flanges 43 and 54 a distance approximately equal to the thickness of in-turned flanges 62 on the track channel. Horizontal strip 84 defines a series of regularly spaced slots 86 along its length (FIG. 6). Each slot has an open end 87 and a closed end 89. The distance between slots 86 is equal to the distance between engagement side rails 60, 70 of the track channels. Thus, the ends of the tracks can be mounted on the cross members with the side rails disposed in adjacent slots and the in-turned flanges disposed between slotted horizontal strip 84 and one of support flanges 43 or 54. The underside of strip 84 forms a retaining surface that engages flanges 62 and prevents vertical movement of the tracks while engagement of the rails in the slots prevents lateral movement. This construction locks the track against lateral or vertical movement with respect to the cross members. Although flanges 62 are turned in according to the preferred structure shown in the drawings, they also may be turned out to perform in the same way.

To facilitate manual placement of the tracks at locations desired along the cross members 36, 38, the track members 42 are shorter in length than the distance between the closed ends 89F and 89R of the slots by an amount slightly greater than the length between closed end 89F and open end 87F of strip 84F. This relationship is shown in FIGS. 3–5.

To secure a track member to a cross member, side walls 60, 70 of the track channels are aligned with a pair of adjacent slots 86R at the desired location along the rear cross member. In FIG. 3, the rear or right end of track 42 is in this position with respect to the rear cross member 38. The track is then moved axially into the slots 86R until the end of the track contacts the closed ends 89R of grooves 86R. The track is then in the position shown in FIG. 4 with the front or left end of the track lying on support flange 43 of the front cross member just to the right of the rear edge of slotted strip 84F. The track is then moved forward to the central position shown in FIGS. 5 and 6 with both ends in slots 86F and 86R and confined beneath the slotted strips 84F and 84R. The front edge of the track is in contact with the closed ends 89F of a pair of slots 86F thereby preventing the track from sliding forward when shelf 14 is tipped slightly so that member 38 is higher than member 36.

If desired, guide members 90, consisting of channels having a cross sectional configuration similar to the track channels, fit into the front and rear cross members in the same manner as the tracks. The cross section of the guide member is elevated at the center to provide a rib for dividing the shelf into lanes for cartons of different sizes. The guides 90 have the same dimensional relationship with respect to the distance between the front and rear cross members as do tracks 42. Thus, these guide members may be placed at any desired location along the width of the shelf. The number of guide members used depends upon the number of lanes desired, which in turn is dictated by the size of the cartons.

What is claimed is:

1. In a gravity feed merchandise storage and delivery rack including a shelf frame defining a front member and a rear member, means for raising the rear member higher than the front member so that the merchandise is urged by gravity toward the front member and parallel tracks for supporting and enabling the movement of the merchandise, each track having a top surface, a front portion adjacent the front member and a rear portion adjacent the rear member, improved means for facilitating the assembly of the rack and for adjustably securing the tracks to the front and rear members comprising:

front support means carried by the front member for supporting the front portions of the tracks;

rear support means carried by the rear member for supporting the rear portions of the tracks;

front slot means for defining a front retaining surface positioned above the front support means at a level below the level of the top surface and for defining a plurality of front slots extending along the front support means;

rear slot means for defining a rear retaining surface positioned above the rear support means at a level below the level of the top surface and for defining a plurality of rear slots extending along the rear support means, front engagement means carried by the front portion of each track and positioned between the front support means and the front retaining surface for comating with at least one of said front slots to restrict the lateral movement of the track and for comating with the front retaining surface to restrict the vertical movement of the track;

rear engagement means carried by the rear portion of each track and positioned between the rear support means and the rear retaining surface for comating with at least one of said rear slots to restrict the lateral movement of the track and for comating with the rear retaining surface to restrict the vertical movement of the track, the front and rear slot means and front and rear engagement means being proportioned such that the track can be moved to an assembly position in which the track is supported by the front and rear support means, the rear engagement means is engaging a rear slot, and the front engagement means is free to be moved laterally along the front slots and such that the track can be moved to an engaged position in which the track is supported by the front and rear support means, at least one front slot is engaged by the front engagement means and at least one rear slot is engaged by the rear engagement means, whereby the track is restricted in both lateral and vertical movement.

2. The rack of claim 1 wherein the front slot means comprises a rigid slotted front strip defining the front slots, each front slot having an open end and a closed end, and the front retaining surface comprises the underside of the front strip, the front retaining surface being spaced above the front support means by a predetermined front gap;

the rear slot means comprises a rigid slotted rear strip defining the rear slots, each rear slot having an open end and a closed end, the rear retaining surface comprises the under side of the rear strip, the rear retaining surface being spaced above the rear support means by a predetermined rear gap;

the tracks have side rails that fit in adjacent slots defined by the front strip or the rear strip;

the front engagement means comprises a front portion of an engagement flange carried by each side rail, each front portion being placed between the front lower retaining surface and the front support means;

the rear engagement means comprises a rear portion of each said engagement flange, each rear portion being placed between the rear lower retaining surface and the rear support means.

3. The rack of claim 2 wherein the front and rear portions of the engagement flange are integrally formed by inward turned lower edges of each side rail.

4. The rack of claim 3 wherein said tracks have rollers mounted on shafts extending between said side rails.

5. The rack of claim 3 wherein the length of said rails is substantially equal to or less than the distance between the closed ends of the front and rear slots minus the distance between the closed end and the open end of the front slots.

6. The rack of claim 5 wherein the length of said rails is greater than the distance between the front and rear support means.

7. The rack of claim 6 wherein the distance between the open and closed ends of the front slots is less than the distance between the open and closed ends of the rear slots.

8. The rack of claim 2 wherein the thickness of the front portions of the engagement flanges is substantially equal to the predetermined front gap and wherein the thickness of the rear portions of the engagement flanges is substantially equal to the predetermined rear gap.

9. The rack of claim 2 wherein the width of the front strip is less than the width of the front support means and the width of the rear strip is less than the width of the rear support means.

* * * * *